US012718114B2

(12) United States Patent
Kulkarni et al.

(10) Patent No.: US 12,718,114 B2
(45) Date of Patent: Aug. 25, 2026

(54) SYSTEM AND METHOD OF MANAGING KNOWLEDGE FOR KNOWLEDGE GRAPHS

(71) Applicant: Siemens Aktiengesellschaft, Munich (DE)

(72) Inventors: Srinidhi Kulkarni, Bangalore (IN); Amlan Praharaj, Bangalore (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 959 days.

(21) Appl. No.: 17/897,348

(22) Filed: Aug. 29, 2022

(65) Prior Publication Data

US 2023/0081891 A1 Mar. 16, 2023

(30) Foreign Application Priority Data

Aug. 31, 2021 (EP) .................................... 21193930

(51) Int. Cl.
*G06N 5/02* (2023.01)

(52) U.S. Cl.
CPC ..................................... *G06N 5/02* (2013.01)

(58) Field of Classification Search
CPC ................................ G06N 5/02; G06N 5/022
See application file for complete search history.

(56) References Cited

U.S. PATENT DOCUMENTS 11,676,001 B2 * 6/2023 Jiao ...................... G06N 3/0455 707/703
2019/0042988 A1 * 2/2019 Brown ................ G06F 16/9535
(Continued)

FOREIGN PATENT DOCUMENTS

WO WO 2021048572 A1 3/2021

OTHER PUBLICATIONS

Chen, Yu et al: "Reinforcement Learning Based Graph-to-Sequence Model for Natural Question Generation"; arxiv.org, Cornell University Library, 201 Olin Library Cornell University Ithaca, NY 14853, Aug. 14, 2019 (Aug. 14, 2019), XP081563657.
(Continued)

*Primary Examiner* — Tarek Chbouki
(74) *Attorney, Agent, or Firm* — Schmeiser Olsen PLLC

(57) ABSTRACT

A system and method for managing knowledge for knowledge graphs is provided. The method including identifying missing links in the knowledge graph; generating inquisitive and contextually relevant questions around the identified missing links for an expert of a domain; in an event no missing links are identified, inquisitive and contextually relevant questions are generated based on a topic and a textual paragraph of topic of interest provided by the expert; receiving response to the questions from the expert via a user interface; generating additional informative questions based on the domain or the response received from the expert or a combination thereof; evaluating the additional informative questions based on a ranking metric derived from a combination of parameters; and populating the missing links in the knowledge graphs, displayed on the user interface, with one or more responses generated corresponding to the evaluated additional informative questions having a highest ranking metric.

13 Claims, 8 Drawing Sheets

(56) References Cited

U.S. PATENT DOCUMENTS

| | | | | |
|---|---|---|---|---|
| 2021/0365599 | A1* | 11/2021 | Martelaro | G06F 30/12 |
| 2022/0261668 | A1* | 8/2022 | Stumpe | G06F 16/284 |

OTHER PUBLICATIONS

Shaoxiong, Ji et al: "A Survey on Knowledge Graphs: Representation, Acquisition and Applications"; arxiv.org, Cornell University Library, 201 Olin Library Cornell University Ithaca, NY 14853; Aug. 9, 2020 (Aug. 9, 2020), XP081735283.

Jiwei, Li: "Teaching Machine to Converse"; arxiv.org, Cornell University Library, 201OLIN Library Cornell University Ithaca, NY 14853; Jan. 31, 2020 (Jan. 31, 2020), XP081589540.

Yunshi, Lan et al: "Complex Knowledge Base Question Answering: A Survey"; arxiv.org, Cornell University Library, 201 Olin Library Cornell University Ithaca, NY 14853; Aug. 15, 2021 (Aug. 15, 2021), XP091034784.

* cited by examiner

100
Identify one or more missing links in the knowledge graph
110
Generate one or more questions around identified missing links
120
Receive responses to questions from subject matter experts
130
Generate additional informative questions
140
Perform evaluation of informativeness of questions
150
Populate information into ontological knowledge graph
160

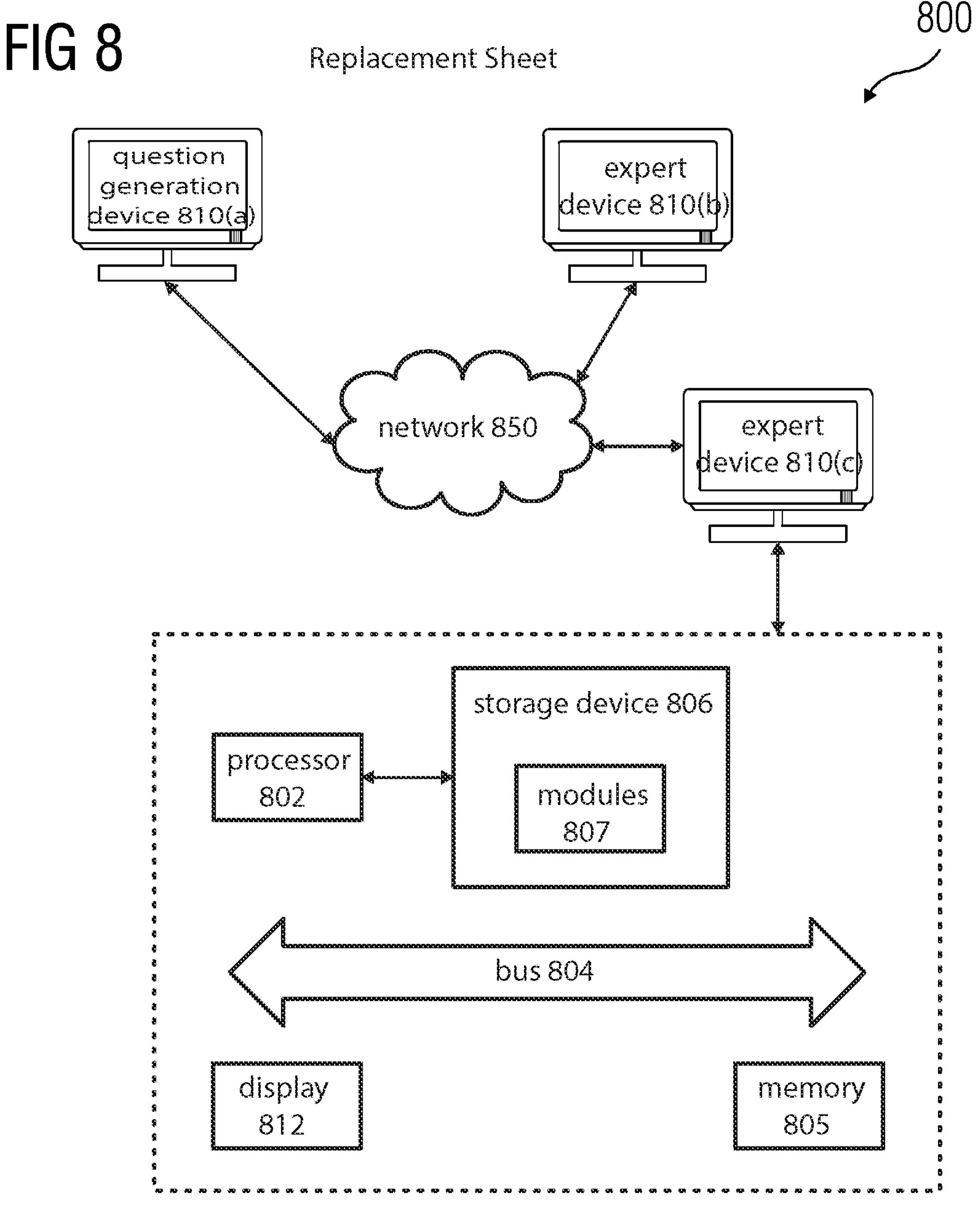
FIG 8
Replacement Sheet
800
question generation device 810(a)
expert device 810(b)
network 850
expert device 810(c)
storage device 806
processor 802
modules 807
bus 804
display 812
memory 805

SYSTEM AND METHOD OF MANAGING KNOWLEDGE FOR KNOWLEDGE GRAPHS

CROSS-REFERENCE TO RELATED APPLICATIONS

This application claims priority to EP Application No. 21193930.1, having a filing date of Aug. 31, 2021, the entire contents of which are hereby incorporated by reference.

FIELD OF TECHNOLOGY

The following relates to management of knowledge for knowledge graphs, and in particular to improved knowledge management for knowledge graphs by exploration of tacit knowledge of experts.

BACKGROUND

Information retrieval and re-use of available organizational knowledge is extremely important across all industries and domains. Often the knowledge to be captured, stored and retrieved is diverse. Knowledge Graphs have become a popular data structure for storing such diverse knowledge. Today, knowledge graphs have moved into industrial domain and large industrial knowledge graphs are being built. Extracting relevant information from such highly complex knowledge graphs has usually been a very tedious and time-consuming task.

Further, extracting adequate information is peculiarly ineffective when the information is highly factual and not very meaningful inferences can be drawn therefrom for lack of intricate details. Furthermore, most formidable challenge with knowledge graphs is that, often these knowledge graphs are populated based on a domain-specific ontology, rendering them not very understandable for those estranged to that domain. In general, information extracted from sources like documents and databases are populated into knowledge graphs. However, in many industries a lot of valuable knowledge is not available in any documented format. It is primarily because a huge body of tacit knowledge remains encapsulated in the minds of experts. Such tacit knowledge is thus typically learnt by apprentices and novices when the experts explain to them these nuggets of information, specifically when the novices ask pertinent and prudent questions to the experts in a contextual fashion.

For instance, an inspection event may involve an engineer visiting a site and making notes. These notes entail a lot of "rule of thumb" and "intuition" based assessments that are not enumerated in the report or service form prepared by the expert. Having the ability to record such processes and intuition would rewardingly benefit future visits to the site as well as novice engineers leaning the trade. Another key challenge with knowledge graphs is that there is no robust mechanism to find out if the knowledge graph is incomplete and deficit of any key information. Such incompleteness or deficiency in industrial knowledge graphs is a stumbling block in decision making based on aggregates and other data driven criteria.

In such events where the knowledge graph is deprived of any vital information, many pertinent queries may remain unsolved. Further, there will be significant delays in obtaining these painstaking details from other sources. However, if there were a system and/or method for automatic identification of the gaps in the knowledge graph, this knowledge graph could have been fixed apriori, thereby minimizing crucial downtime.

Furthermore, even when such gaps in knowledge are identified, there exists no way to pose questions to the relevant experts in a natural language to obtain the missing information. In particular, allowing experts to fill in the relevant information using a conversational or otherwise interactive agent can ease the process for experts not adept at editing databases or other digital records.

Ordinarily, Knowledge Graph Completion (KGC) has been attempted by treating knowledge graphs as a collection of triples—subject (s), predicate (p) and object (o) or (s, p, o). Most completion methods propose triples (s', p', o') and use scoring functions to evaluate the plausibility of the triple. Some methods use translation distance or semantic matching to achieve end objective of knowledge graph completion. Nevertheless, the aspect of eliciting tacit knowledge from experts is very difficult. Attempts have been made to capture expert knowledge as rules. However, these methods suffer from the problem that some valuable knowledge nuggets are elicited only contextually and based on inquisitive conversations. Thence, asking questions is an important part of overall process to learn about the world from those who are more knowledgeable and with more experience. Asking the right and targeted questions is even more imperative, as otherwise the context may quickly get driven towards a pointless discussion from what otherwise should have been a correct and suitable conversation.

While prior works have endeavored creating question generation conversational chat-bots or agents, fundamentally all of these methods suffer from a major flaw. They generate questions based on available paragraphs or knowledge, which is useless in any attempt to learn entirely 'new' knowledge. The crucial challenge is to build agents that can generate inquisitive and conversationally relevant questions that are not answered previously and about questions for which the agent has no knowledge. Also, most commonly observed shortcoming of asking repetitive and open-ended questions in a conversation has never been addressed with any compelling solution.

In light of the above limitations, there exists a need for a mechanism for improved and effective management of knowledge within knowledge graphs based on exploration of 'new knowledge' by asking inquisitive, relevant, meaningful and non-repetitive questions from experts.

SUMMARY

An aspect relates to a computer-based method of knowledge management for knowledge graph. The method comprises identifying one or more missing links in the knowledge graph. The method further comprises generating one or more inquisitive and contextually relevant questions around the identified missing links for an expert of a domain. It is followed by receiving response to the questions from the expert and generating one or more additional informative questions based on the domain or the response received from the expert or a combination thereof.

The one or more additional informative questions so generated are evaluated based on a ranking metric derived from a combination of parameters. Finally, the method comprises populating the missing links in the knowledge graphs with one or more responses generated corresponding to the evaluated additional informative questions having a highest ranking metric.

As used herein, the "knowledge graph" comprises a plurality of nodes representative of plurality of entities within a domain specific corpus, while the edges between the plurality of nodes are representative of relationships existing between the entities.

Also, such a relationship between an entity and an entity of interest from the plurality of entities is based on non-trivial similarity between connectivity patterns of the entity and the entity of interest. As used herein "non trivial similarity" is used with reference to the substantial semantic similarity between the pair of nodes representative of information from a particular domain. The substantial semantic similarity is based on commonality of major attributes and features shared between the entities defined by pair of nodes.

Further, the method for management of knowledge in a knowledge graph comprises transformation of the plurality of nodes and the edges into one or more embeddings. The embeddings here refer to a vector or a set of vectors signifying features of a corresponding entity and an embedded relationship between the entities within the knowledge graph. The embeddings effectively captures the overall graph topology, relationship between the entities and other relevant information, making the operations further performed on this compressed representation of graph much simpler and faster.

Now, node embeddings are computed for a subsection of knowledge graph, the subsection comprising a central node with all its immediate relations with other nodes and properties/attributes of central node along with the other related nodes. This is followed by determining a semantic similarity between the pluralities of nodes based on cosine distance between their representative vectors. The semantic similarity between representative vectors is significant of useful semantic relation existing therebetween, which is measured computing cosine distance that determines the magnitude of similarity between the vectors.

In an embodiment, the missing links in the knowledge graph are identified by first determining, individual predicate for the semantically similar nodes having the cosine distance smaller than a predetermined threshold. This is followed by combining the individually determined predicate by a union operation. Finally, the predicate between the nodes are compared with the individually determined predicate to identify the one more missing links between the semantically similar nodes. Here, a predicate refers to an edge between one or more nodes constituting the knowledge graph.

One or more inquisitive and contextually relevant questions around known unknowns are formed once the missing links are identified. These questions are generated in natural language to harness known unknowns of the domain using any of natural language processing approaches (NLP). Thus, a factoid-based inquisitive and contextually relevant question understandable to the expert is generated from a node which is selected along with a corresponding predicate that has an unknown tail node value.

In one specific embodiment, the process steps followed to obtain inquisitive and contextually relevant questions around 'known unknowns' comprise of: encoding at least a subsection of graph to obtain a topic representation using graph embeddings; followed by encoding each pair of the inquisitive and contextually relevant question along with the response received with the encoded topic representation; and finally applying decoder with attention to the topic representation and encoded question-response pair to generate the one or more additional informative questions.

Once the information regarding 'known unknowns' is completed, 'unknown unknowns' may be scouted for by exploring tacit knowledge available with the experts. In one exemplary embodiment, to initiate such an information mining process, the expert is asked to provide a topic and context to the topic in form of a short textual topic paragraph. Technically, most important aspect here is generation of additional informative questions. This is achieved using a sequence-to-sequence model with encoder-decoder architecture. In one embodiment, the process steps followed to obtain additionally informative questions around 'unknown unknowns' comprise of: encoding a specific topic by way of using at least a text paragraph of specific topic within the domain to obtain a topic representation; followed by encoding each pair of the inquisitive and contextually relevant question along with the response received with the encoded topic representation; and finally applying decoder with attention to the topic representation and encoded question-response pair to generate the one or more additional informative questions.

The method now proceeds with computation of ranking metric derived from a combination of parameters comprising inquisitiveness metric, specificity metric and repetitiveness of the additional informative questions generated. In particular, the ranking metric is calculated as:

$$\text{Ranking metric} = \lambda * \text{inquisitiveness metric} + (1-\lambda) * \text{specificity metric} - \lambda 2 * \text{repetitiveness};$$

where λ, is a first hyperparameter; and λ2 is a second hyperparameter.

Now, to factor in repetitiveness component, above shown penalty term is incorporated in ranking metric to penalize the questions that have been previously asked. This involves keeping a track of all questions asked in the conversation history and all new candidate questions whose ranking metric is being evaluated. Semantic similarity is then computed for all the questions in conversation history.

Lastly, the method of managing knowledge in a knowledge graph comprises updating response received from expert to additionally informative questions within the knowledge graph. Receiving response from experts either as a response to direct questions or as a response to leading, open ended question, needs to be further processed and populated in a structured database. This information is to be populated into an ontological knowledge graph.

For the same, a multi-stage approach is adopted in accordance with present disclosure to populate the knowledge graph with relevant, specific, unique and informative expert response.

At first, the response is subject to pre-processing at various levels of completeness, correctness, relevancy, uniqueness and the like, from a semantic, syntactic and grammatical view points, using any of the conventionally existing techniques.

It is followed by segmenting the response into one or more named entities using, though not limited to, a custom named entity recognition model (NER) in accordance with one illustrative embodiment of present disclosure. In particular, keywords in form of nouns in the response can be used to identify the relevant ontological classes that are referred in the statement. Finally, the response structure is used to identify the appropriate attribute or object property for populating in the knowledge graph.

In another aspect of embodiments of the present invention, a system of knowledge management for knowledge graph is presented. The system comprising: a processing unit and a memory coupled to the processing unit. The memory comprises instructions which, when executed by the processing unit, configures the processing unit to perform the method steps described above.

In still other aspect of embodiments of the present invention, a computer program product (non-transitory computer readable storage medium having instructions, which when executed by a processor, perform actions) having machine-readable instructions stored therein, that when executed by a processing unit; cause the processing unit to perform the aforementioned method steps.

Embodiments of the present invention are not limited to a particular computer system platform, processing unit, operating system, or network. One or more aspects of embodiments of the present invention may be distributed among one or more computer systems, for example, servers configured to provide one or more services to one or more client computers, or to perform a complete task in a distributed system. For example, one or more aspects of embodiments of the present invention may be performed on a client-server system that comprises components distributed among one or more server systems that perform multiple functions according to various embodiments. These components comprise, for example, executable, intermediate, or interpreted code, which communicate over a network using a communication protocol. Embodiments of the present invention are not limited to be executable on any particular system or group of systems, and is not limited to any particular distributed architecture, network, or communication protocol.

BRIEF DESCRIPTION

Some of the embodiments will be described in detail, with reference to the following figures, wherein like designations denote like members, wherein:

FIG. 8 shows a block diagram of a system of managing knowledge for a knowledge graph, according to an embodiment of the present invention.

DETAILED DESCRIPTION

Figure 1:
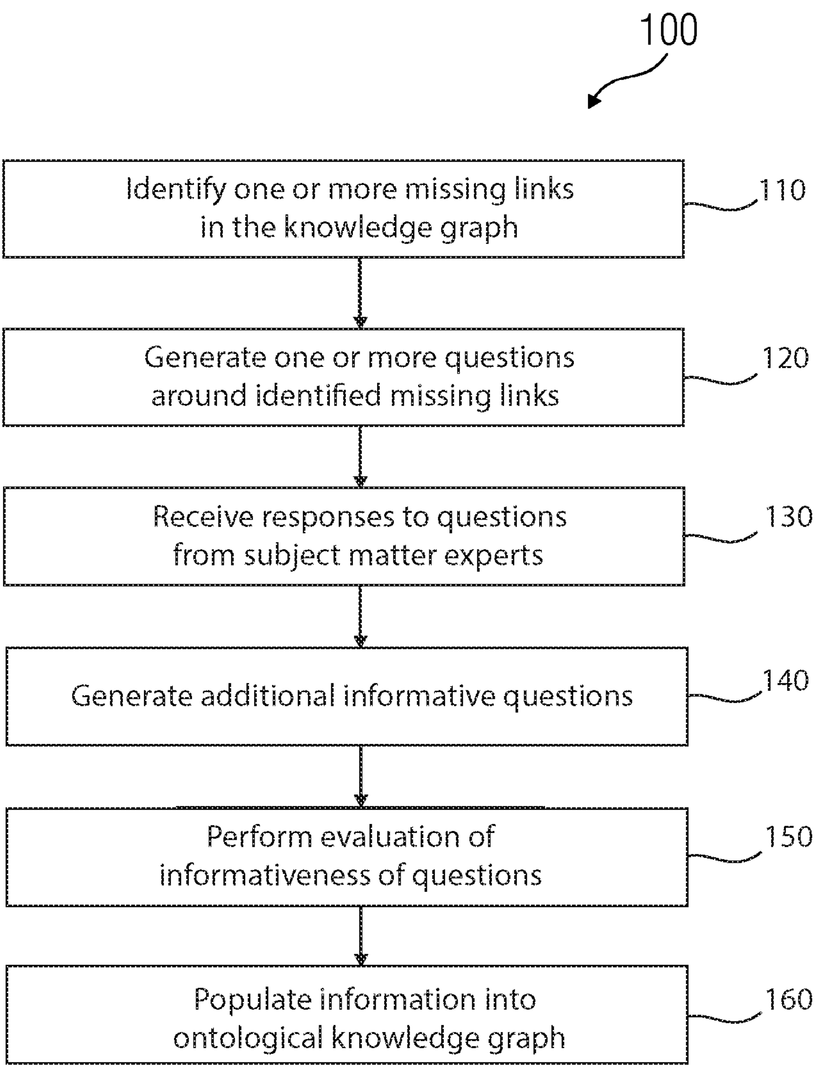
FIG. 1 shows a flowchart of a method of managing knowledge for knowledge graphs, according to an embodiment of the present invention.

Hereinafter, embodiments for carrying out embodiments of the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

The embodiments herein provide steps shown in FIG. 1 that may be performed in a computer system such as a set of computer-executable instructions and, although a logical order is shown in the flow charts, in some cases, the steps shown or described may be performed in an order different than here.

Before beginning a more detailed discussion of the various aspects of the illustrative embodiments, it should first be appreciated that throughout this description the term "mechanism" or "technique" will be used to refer to aspects of the present disclosure that perform various operations, functions, and the like. A "mechanism," as the term is used herein, may be an implementation of the functions or aspects of the illustrative embodiments in the form of a system, a method, or a computer program product. In the case of a method, the method steps are implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of embodiments of the present invention.

FIG. 1 is a flowchart of knowledge management method 100 for a knowledge graph, according to an embodiment of the present disclosure. As will be discussed in greater detail hereafter, the illustrative embodiments are integrated to extend the functionality of knowledge management in knowledge graph for its improved performance with regard to completeness, relevancy, specificity and uniqueness of information constituting the knowledge graph. That is, the mechanisms of the illustrative embodiments improve the performance and operation of knowledge management within knowledge graphs by identifying gaps persisting in the available knowledge graph and correcting/updating/completing the graph with additional knowledge customarily held within the minds of subject matter experts.

Thus, in order to understand the context in which the improvements of the illustrative embodiments are implemented, it is important to first have an understanding of how knowledge management for a knowledge graph is implemented before describing how the mechanisms of the illustrative embodiments are integrated in to augment the performance of these graphs. It should be appreciated that the mechanism of generating questions and obtaining relevant responses from the experts, as described in FIGS. 1-7 are only examples and are not intended to state or imply any limitation with regard to the type of knowledge acquisition and management mechanisms with which the illustrative embodiments are implemented. Many modifications to the example system shown in FIGS. 1-8 may be implemented in various embodiments of embodiments of the present invention without departing from the spirit and scope of embodiments of the present invention.

Accordingly, the method 100 begins at step 110 with the identification of one or more missing links in the knowledge graph. According to an embodiment herein, missing link refers to missing information from a corpus of data which needs to be identified. If there is an uncertainty associated with completeness of information, requiring additional/alternate data to be linked for deriving a meaningful understanding from the given knowledge graph implies a missing link. In an embodiment, missing information or link are nuggets of information/know how, which either bridge gaps in existing chunks of information or provide probable answers to input questions for establishing rich and meaningful connections in a knowledge graph.

Typically, a knowledge graph comprises of one or more graph data structures representing entities as nodes in the graph and edges between the nodes representing relationships between the entities. The entities are identified from analysis of corpus of information associated with a particular domain and relationship between such corpuses of information is represented by weighted edges. Precisely, graphical representation of a vast corpus of information assists in quick and easy inference of information for logical and instant decision making. It will be appreciated by a person skilled in the art that the generation of knowledge graph may be realized in any manner generally known in the art.

Figure 2:
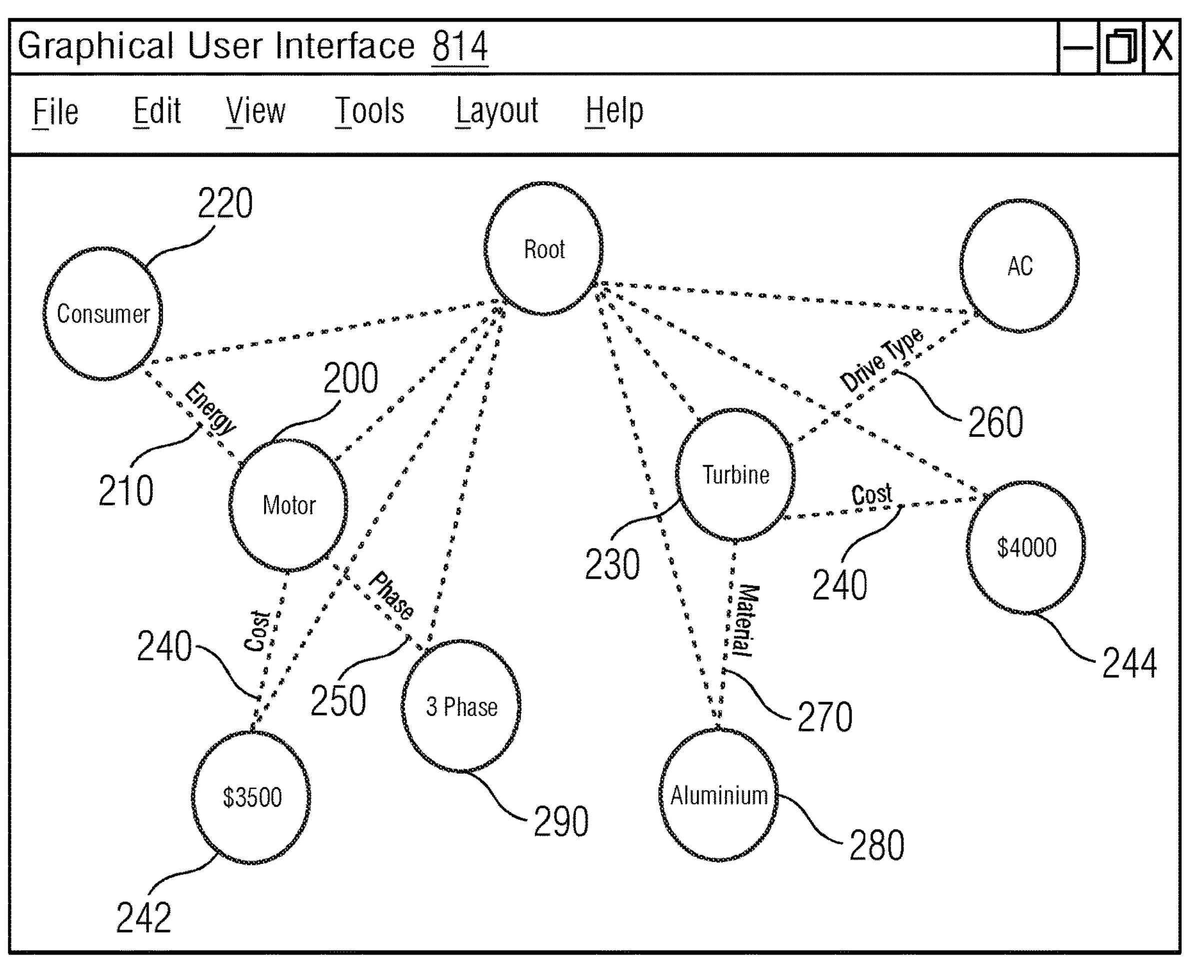
FIG. 2 shows an example of a knowledge graph representing relationship between constituting nodes, according to an embodiment of the present invention.

Following from above, every two nodes reprsentative of entities are connected by edges (relationships between nodes). Each set of head node, relation and tail node is known as a triple. An example of a knowledge graph is shown in FIG. 2, where a triple is borrowed from an engineering domain—motor 200, energy 210, consumer 220. In accordance with one working embodiment and for merely exemplary purposes, it is assumed that the knowledge graph of FIG. 2 is not disjoint. Here, disjoint is defined as a graph with subgraphs without any connecting edges. In this example, if the root node does not exist, the graph would be considered as disjoint.

Each node will have a set of relevant relations and nodes attached to each relation. Some nodes will have similar predicates (edges) because they are similar by nature. In this case, turbine 230 and motor 200 are machines and thus should have non-trivial similarity in connectivity patterns and relations. As shown in FIG. 2, they have a significantly common (non-trivial) relation "cost" 240 and the tail node values are "$3500" (242) and "$4000" (244) for motor 200 and turbine 230 respectively.

The primary objective is to find the missing link/information in incomplete graphs. For example in FIG. 2, turbine 230 has the missing relations "phase" 250 and "energy" 210 and motor 200 has the missing relations "drive type" 260 and "material" 270. Moreover, the tail node values to these relations is only known to a human. The first task is to find the missing relations for each node in the graph.

For this, the graph node embedding approach is opted. Accordingly, each of the nodes and connecting edges of the knowledge graph are transformed into node embeddings. Node embeddings are vector representations of each node and edge along with the neighbors in the graph which captures the meaning of each element in the graph. There are several methods that can be used to achieve this sub-task. Taking inspiration from word embedding techniques in Natural Language Processing like GLoVE, Word2Vec etc, it may be extended to knowledge graphs such as Node2Vec and Graph2Vec. In accordance with one example embodiment, Graph Attention Network (GAT) is used for exemplary purposes. It is primarily to cater to engineering applications that may be heavy on quantitative metrics, parameters, names of machines, etc. Using such a method helps combat the non-comprehension of engineering domain terms by out of the box word vectorizers.

Each element in the graph is initialized with a random vector of a dimension N. Thereafter, the vector of each element in the graph is iteratively updated until convergence. Thus, in this manner the node embeddings are obtained for each element (node and edges) of the knowledge graph (as can be seen in Table 1 below).

TABLE 1

| Element | Vector |
|---|---|
| Motor 200 | [0.234 −1.24 0.31 . . . 0.98 1.53] |
| Turbine 230 | [2.562 0.649 −0.043 . . . −0.18 −1.01] |
| . . . | . . . |
| 3 phase 290 | [3.276 1.69 −0.01 . . . 0.77 1.153] |
| Aluminium 280 | [−0.234 1.94 0.24 . . . −0.9 2.23] |

Figure 3:
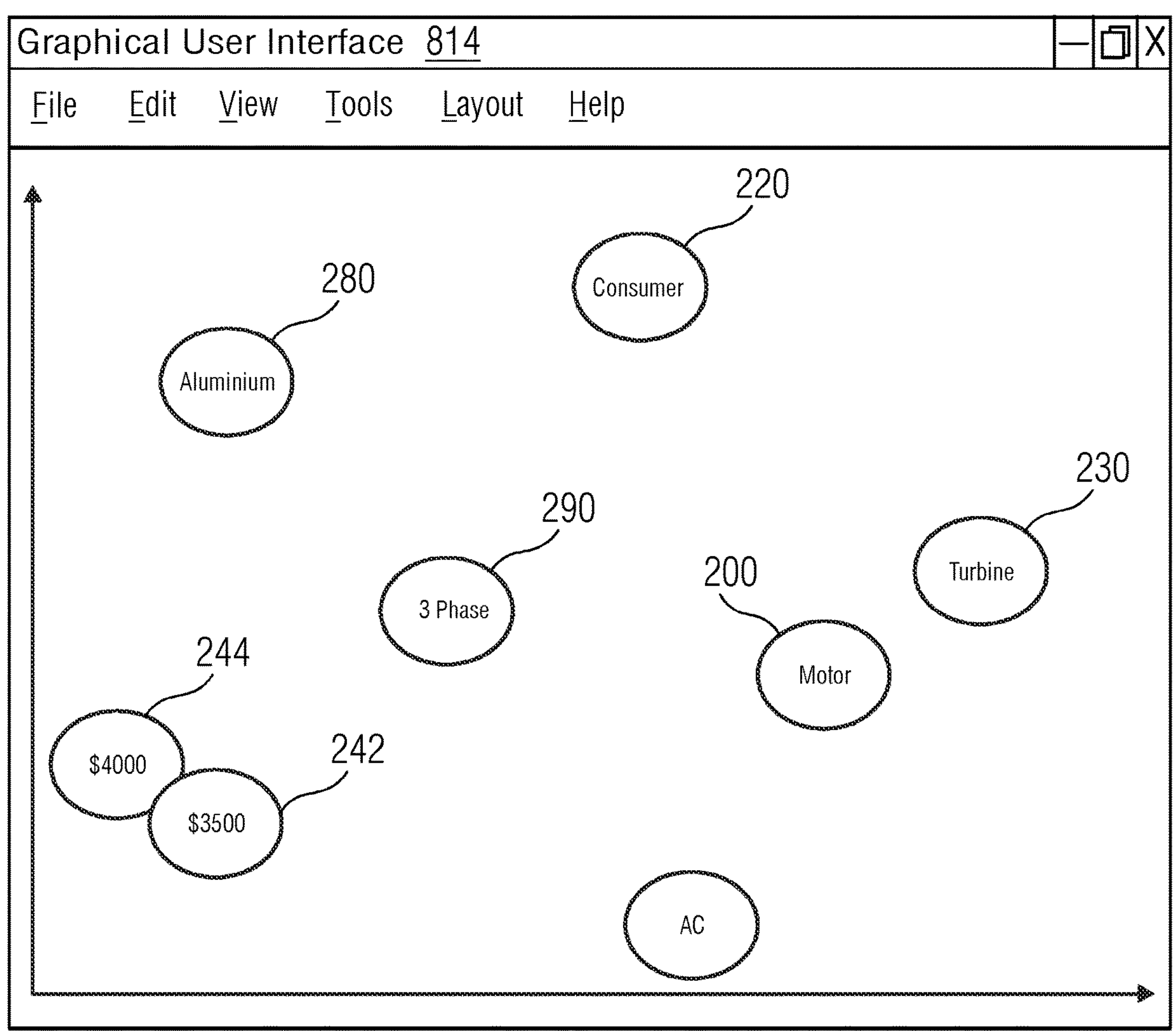
FIG. 3 shows a knowledge graph having semantically similar nodes, according to an embodiment of the present invention.

The vectors having semantic similarity will exhibit a smaller cosine distance. If the dimensionality is reduced to represent each node vector on a 2D plane, a graph obtained will be like shown in As can be seen in FIG. 3, the nodes "motor" and "turbine" are closer together because they have a few similar relations. Similarly, the nodes depicting "$3500" and "$4000" are further closer because they also have similar relations. For this reason, node embeddings are used. This spatial configuration of each node in the vector space captures the inherent meaning of each node with respect to its edges and neighbors.

Next, once the node embeddings are obtained for each element of the knowledge graph, an important subtask is finding the missing relations using these node embeddings. This is done by finding similar nodes with respect to each other node and neighbors in the knowledge graph using cosine similarity. Since similar nodes should have similar predicates, a simple union operation is applied to the set of predicates for the first node and the second node and then compared with the initial set to find missing relations.

Figure 4:
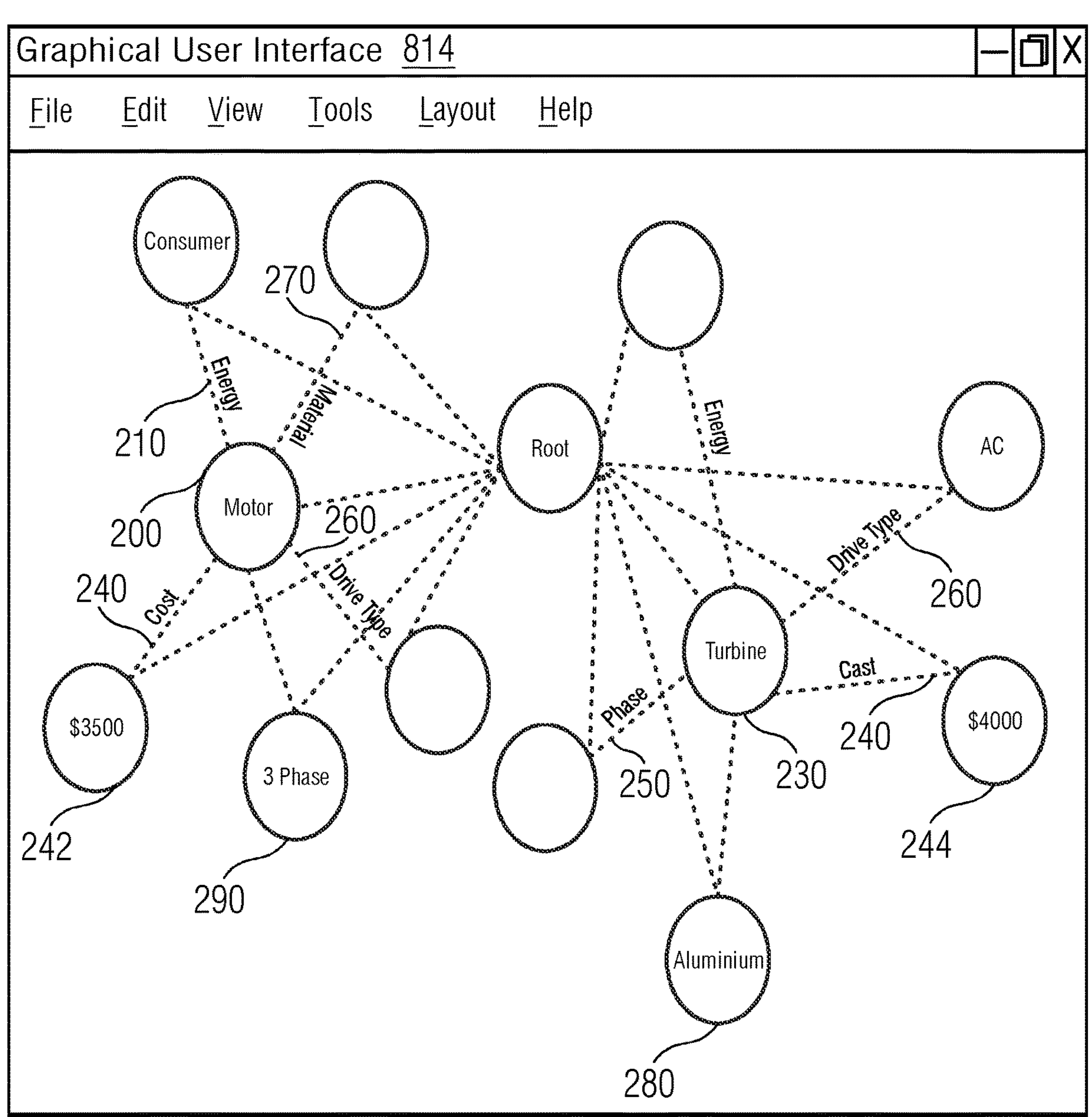
FIG. 4 shows a transformed knowledge graph with node embeddings, according to an embodiment of the present invention.
Figure 5:
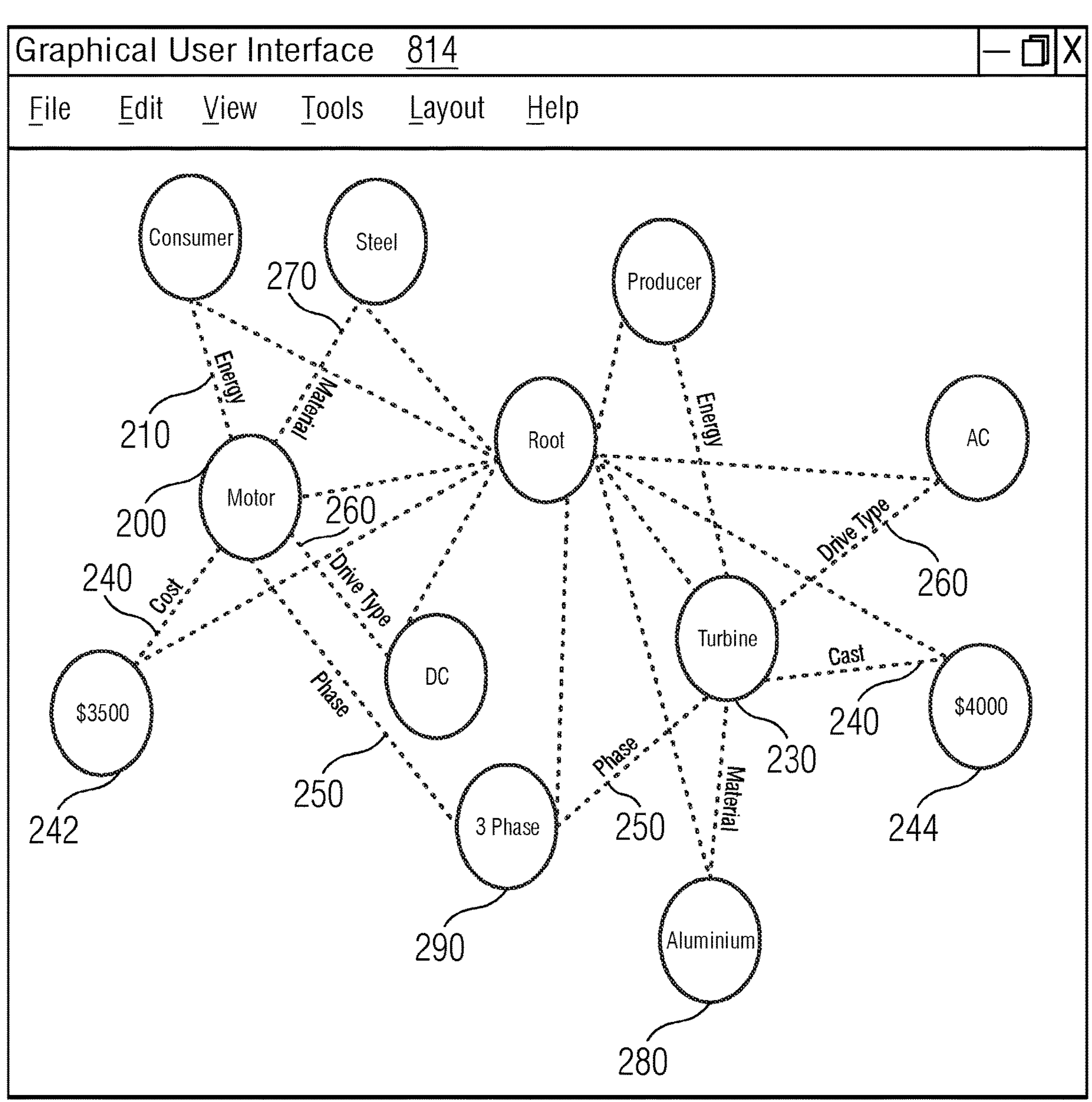
FIG. 5 shows an example of a completed knowledge graph supplemented with additional information, according to an embodiment of the present invention.

Referring back to above example, "motor" 200 and "turbine" 230 will have small cosine distance being semantically similar. Hence, this pair is selected, and their predicates are unionized to obtain the set ("cost" 240, "material" 270, "drive type" 260, "phase" 250, "energy" 210). This union set is compared with individual set of predicates for "motor" 200 and "turbine" 230 and the missing relations are found. Here, as can be seen in FIG. 4, "motor" 200 will have the missing relations "drive type" 260 and "material" 270 and "turbine" 230 has the missing relations "phase" 250 and "energy" 210.

This solves the task of finding relevant missing information.

As discussed above, knowledge graphs have been analyzed as a collection of triples, and there are methods proposed to reference the attributes in the ontology that are missing. However, these approaches never consider the variations between one individual and another. Knowledge graph completion posits even a greater challenge if one is to be assured of no existing missing links while accommodating variations in opinions from various subject matter experts.

Conversation being a primary medium to seek right answers to specific and contextually relevant questions is modelled for capturing knowledge nuggets, especially in scenarios where absolutely 'new' knowledge is to be acquired without having any access to existing or known context. As will be used hereinafter, the term "inquisitive and contextually relevant questions" refers to most relevant information discovered, prioritized, summarized and contextualized from large corpus of structured/unstructured data to elicit appropriate response from an expert of a specific domain. For example, building competitive intelligence for a vaccine in a healthcare domain should requisite generating of such healthcare vaccine relevant questions (contextual) that will be answered by those experts in that field.

In same vein, the present disclosure for managing knowledge acquisition as well as knowledge management for knowledge graphs in a more complete and competent manner is applicable to any of known domains—e.g., financial domain, medical domain, legal domain, engineering domain, etc., where the corpus of information belonging to respective domain can be structured to constitute a repository of domain-specific information, such as ontologies, or unstructured data related to the domain.

Thus, the next main task is to pose questions to the human user, who is a subject matter expert. This can be achieved by, but not limited to, using rule-based approaches, Natural Language Question Generation Models, probabilistic models etc. In accordance with one working embodiment, a simple rule-based mechanism is employed to generate one or more natural language questions. However, the method can be extended to other question generation techniques.

Therefore, at step 120, the method 100 requires generation of one or more inquisitive and contextually relevant questions around the identified missing links for an expert of a domain. In accordance with one embodiment, the generation of such inquisitive and contextually relevant questions around 'known unknowns' requires extraction of knowledge specific to a domain from an unstructured text using ontology and positing questions related thereto for experts of that field. The extraction methodology may be based on semantic understanding of the unstructured text and the ontology in question. In natural language processing, question generation may be explored to improve the systems in various natural language processing tasks, e.g., the quality of question answering systems as well as information retrieval in an open-domain question answering system.

The semantic understanding of information corpus may be based on relation between different words, phrases, vocabularies, symbols, connotations, signifying interpretation of the sentences using any of natural language processing tools.

In accordance with one working embodiment, the mechanism of generating inquisitive and contextually relevant questions is based on selecting a pair of nodes that consists of the head node and a predicate whose tail node value is unknown. It then uses a template "What is the _relation_ for _head_node_?". In order to form a meaningful question, the relation is suitably replaced with "_relation_" and head node is substituted with "_head_node_". Hence, for example purposes, the contextually relevant questions that gets generated can be seen in the Table 2 below:

TABLE 2

| Pairs | Question |
|---|---|
| Motor 200, material 270 | What is the material for motor? |
| Turbine 230, phase 250 | What is the phase for turbine? |

This mechanism creates a factoid-based question understandable to a human expert, who then answers it appropriately based on his distinguished understanding and skillfullness of that domain. Hence, at step 130, the valuable responses to the questions generated in steps 120 is received from subject matter experts, which are plugged as missing links or pieces of information in the knowledge graph. When the questions are answered, the answers are processed for it to be populated into the knowledge graph. The end result will be similar to what is represented in the completed knowledge graph of FIG. 5. This strategy can be employed to enhance the knowledge graph with more information making the knowledge graph richer and denser.

However, in any event no missing link in the knowledge graph is identified, in accordance with one preferred embodiment of present invention; further information is acquired by starting with questions based on a topic from expert and an associated textual paragraph as context. Accordingly, in order to address ever persisting technical problem of acquiring information in an open-domain communication setting effectively, additional informative questions around the unknown unknowns are generated at step 140, in accordance with one exemplary embodiment. Step 140 aims to gather expert knowledge about unknown unknowns. i.e. identify what is unknown and then proceeding to obtain expert knowledge to fill these unknowns.

Accordingly, a chat bot or agent may be devised that poses inquisitive and such contextually relevant (additional) questions to an expert, based on a conversation that it engages with an expert. The valuable expert responses can be processed to obtain useful 'new' knowledge.

In one example embodiment, it is assumed that the communication is between two individuals: a knowledge seeker and a knowledge provider. Both share a common topic for discussion to enrich the already existing information. The goal of knowledge seeker is to acquire additional knowledge of the topic by asking relevant questions to the knowledge provider, an expert. The expert (only) has direct access to the knowledge, which the knowledge seeker may not have. In this scenario, it is presumed that the only communication that happens between the knowledge provider and the knowledge seeker is through conversation i.e. a knowledge seeker posting questions and the knowledge provider providing adequate answers thereto. A communication history is shared between the knowledge provider and the knowledge seeker based on whatever conversation has happened till that time. Another constraint is that the knowledge provider only provides answers based on the private knowledge he beholds.

A model is now built to investigate how to enable the knowledge seeker to reason pragmatically about which questions to ask to efficiently acquire knowledge, given only the topic and the conversation history. This setting of information-seeking conversations involves many interesting and challenging problems in natural language processing. The main challenge is to train a model to ask informative and specific questions, so it can learn knowledge about arbitrary topics by conversing with a human in a dialogue.

Figure 6:
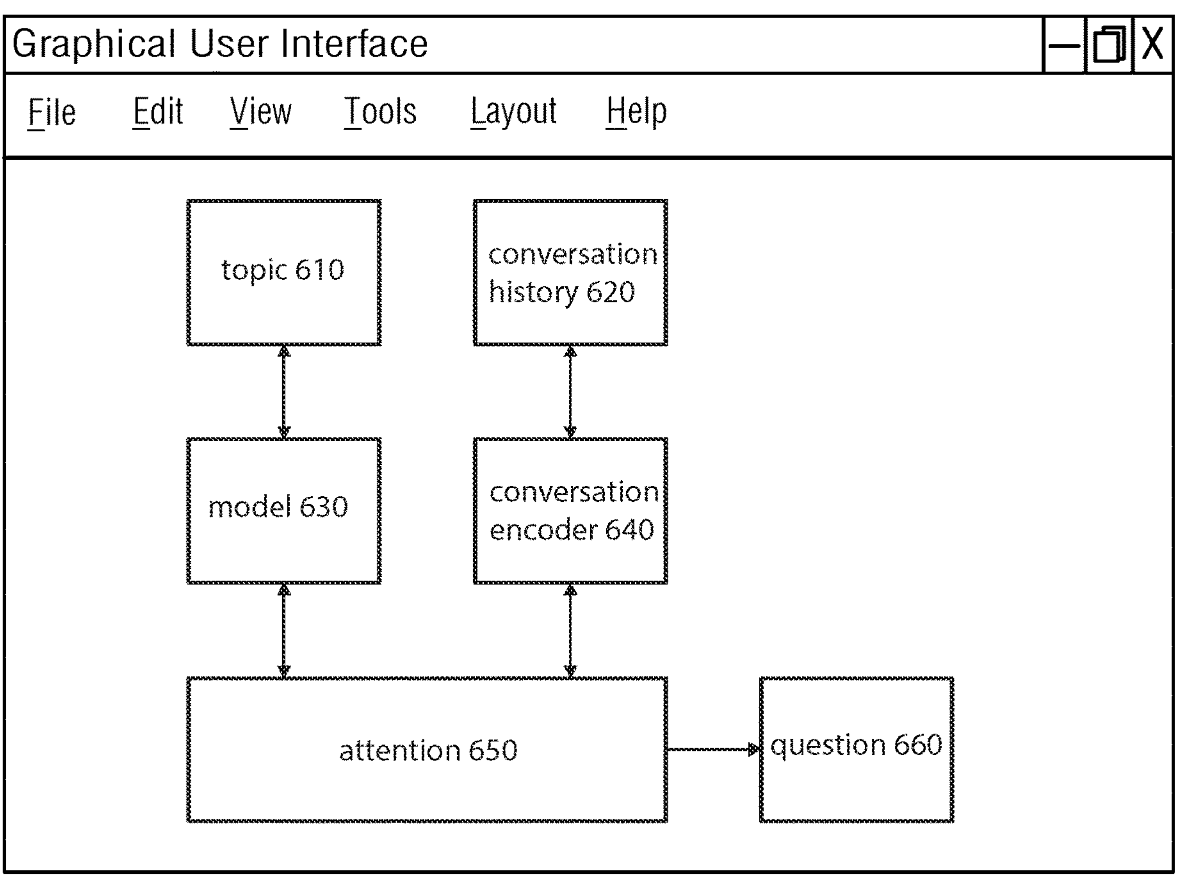
FIG. 6 shows a sequence-to-sequence model for additional informative question generation, according to an embodiment of the present invention.

Referring now to FIG. 6, a description of model 600 for generating inquisitive and contextually relevant questions as well as additionally informative questions is explained. The only assumption is that the topic 610, conversation history 620 and knowledge are given in the natural language. Since the conversation history 620 is in terms of question answer pairs, the conversation history is also considered as question answer pairs.

Firstly, a sequence-to-sequence model is employed with an encoder-decoder architecture to generate inquisitive and contextually relevant questions around known unknowns. Here, the starting point is encoding at least a subsection of graph using graph embeddings/graph attention network approach to obtain a topic representation, and use the resulting topic representation in the conversation encoder 640. In an exemplary embodiment, node embeddings are computed for at least a sub-section of graph using graph attention network (GAN).

In another method, for generating additionally informative questions, a sequence-to-sequence model 630 is built that encodes the information available to the knowledge seeker and decodes it into the next question in the conversation that the knowledge seeker should ask. These open-ended questions could enrich the knowledge graph since the expert would not be constrained as to the extent of information they can provide. In one embodiment, the starting point for such an application would be a textual paragraph about a topic. Specifically, the methodology would be to represent the topic using a topic embedding. Accordingly, in one example embodiment, for generating questions around the unknown unknowns, the shared topic between the knowledge seeker and the knowledge provider is modelled with a bi-directional LSTM (BiLSTM) 630, and use the resulting topic representation in the conversation encoder 640.

Thereafter, a representation of conversation is obtained with hierarchical LSTM encoders: first each pair of question and answer is encoded with topic representation using a BiLSTM 630, and then these pair representations are fed into a unidirectional LSTM in the direction that the conversation unfolds. To generate the question, LSTM decoder is applied with attention 650 both on the topic and the conversation history. This allows efficient batch computation for each conversation as these representations are shared across different turns. Intuitively, this trains the model to mimic the observed questions asked from the knowledge provider to put forth next question 660.

However, to finally assess how well generated additionally informative questions actually are, evaluation of the informativeness of these questions is performed at step 150. For generating pragmatically apt questions representative of 'new' and additional knowledge over previous knowledge, the candidate questions are evaluated for their suitability based on a combination of parameters, namely-inquisitiveness, specificity and repetitiveness.

In one significant embodiment, it is pertinent to note that inquisitiveness is characterized by an extent to which the new knowledge/information reveals about information provider's knowledge (K) beyond what is provided in the conversation history (H) of the knowledge seeker and the provider. Inquisitiveness is derived by leveraging the observation that more new information an answer reveals about 'K', the more likely it involves words that have not already been mentioned in 'H'. More the predicted answer overlaps with any of previously revealed answers, the less new information it contains.

This definition of inquisitiveness does not rely on any specific question-response model. For exemplary purposes, a bidirectional attention flow model with self-attention is selected.

Now, turning to another parameter for evaluating the additional informative questions-'specificity', it is understood to be an important metric for generating pragmatic conversational questions. It is selected primarily to avoid generation of overly generic or disruptive questions. In one example embodiment, a classifier is trained to sort the negative examples questions from the ones that are actually part of conversation between the knowledge seeker and the provider. Once the classifier is trained, scores are assigned to different candidate questions to evaluate how specific each is to the current conversation history.

The negative questions, as stated above, refer to those candidate questions that are either too frequent or are random ones. The model is trained to assign a probability that a question is the true next question (positive) given the conversation history. The classifier may be trained jointly with above mentioned model for inquisitiveness, and specificity reward may be offered to bias the model towards generating questions that are not only informative, but also specific to the given conversation history. In accordance with one preferable embodiment, a discriminative classifier is trained to contrast the relevant and coherent follow-up question against randomly sampled negative questions (irrelevant) from other conversations and overly generic or out-of-order questions.

Specifically, the overall ranking metric for the generated candidate questions (Ri) for the ith candidate question is given by:

Ri=λ+(1−λ)*Si, where λ, is a hyper-parameter between 0 and 1, Ii is the inquisitiveness metric and Si is the specificity metric for the ith candidate question. The candidate question with the highest ranking is asked as a question to the expert. In addition to the inquisitiveness and specificity parameter, another critical parameter that is considered for evaluating completeness of questions being asked is repetitiveness. This solving the problem of redundant questions being asked from the expert and adds to the overall effectiveness of knowledge graph completion.

To factor in repetitiveness component, a penalty term is incorporated in ranking metric to penalize the questions that have been previously asked. This involves keeping a track of all questions asked in the conversation history and all new candidate questions whose ranking metric is being evaluated. Semantic similarity is then computed for all the questions in conversation history. Let this penalty term be 'P' and the semantic similarity be given by Cij, for the similarity between $i^{th}$ candidate question and $j^{th}$ question in conversation history.

Pi is given by:

$$Pi=\max(Cij), \text{ for all } j$$

Thus, the ranking of each candidate is computed as:

$$Ri=\lambda*Ii+(1-\lambda)*Si-\lambda 2*Pi, \text{ where } \lambda 2 \text{ is yet another hyper-parameter.}$$

This ensures that the repetitive questions are not posed in process of completing the knowledge graph. Incidentally, going around in a loop asking repetitive questions is one of the biggest problems observed in answering customer queries, in several banking or product-based services. With repetitiveness quotient being penalized, the system and method of present disclosure overcomes this long hauling technical problem.

Receiving response from experts either as a response to direct questions or as a response to leading, open ended question, needs to be further processed and populated in a structured database. At step 160, the information is to be populated into an ontological knowledge graph. This requires populating and updating the missing links from the relevant answers received from experts in response to the additionally informative questions.

The technological challenge for the task is mapping relevant concepts based on the expert's response, the qualifications of the persona, etc. and then extracting the necessary attributes to populate into the graph. A multi-stage approach is adopted in accordance with present disclosure to populate the knowledge graph with relevant, specific, unique and informative expert response.

At first, the response is subject to pre-processing at various levels of completeness, correctness, relevancy, uniqueness and the like, from a semantic, syntactic and grammatical view points, using any of the conventionally existing techniques. It is followed by segmenting the response into one or more named entities using, though not limited to, a custom named entity recognition model (NER) in accordance with one illustrative embodiment of present disclosure. In particular, keywords in form of nouns in the response can be used to identify the relevant ontological classes that are referred in the statement. Finally, the response structure is used to identify the appropriate attribute or object property for populating in the knowledge graph.

In a more generic context, using the base sentence in a response to run the proposed pipeline would produce acceptable results. However, in an engineering domain, challenge of resolving abbreviations requires an added attention. In one example scenario, remarks from a service engineer may be like "High wear components on an AGT would be the first stage nozzle and blades of the HPT. Typically, the TBC wears out over time and the base metal subsequently experiences oxidation". Some of the abbreviations such as AGT, HPT and TBC are conferred with a lot of meaning.

Figure 7:
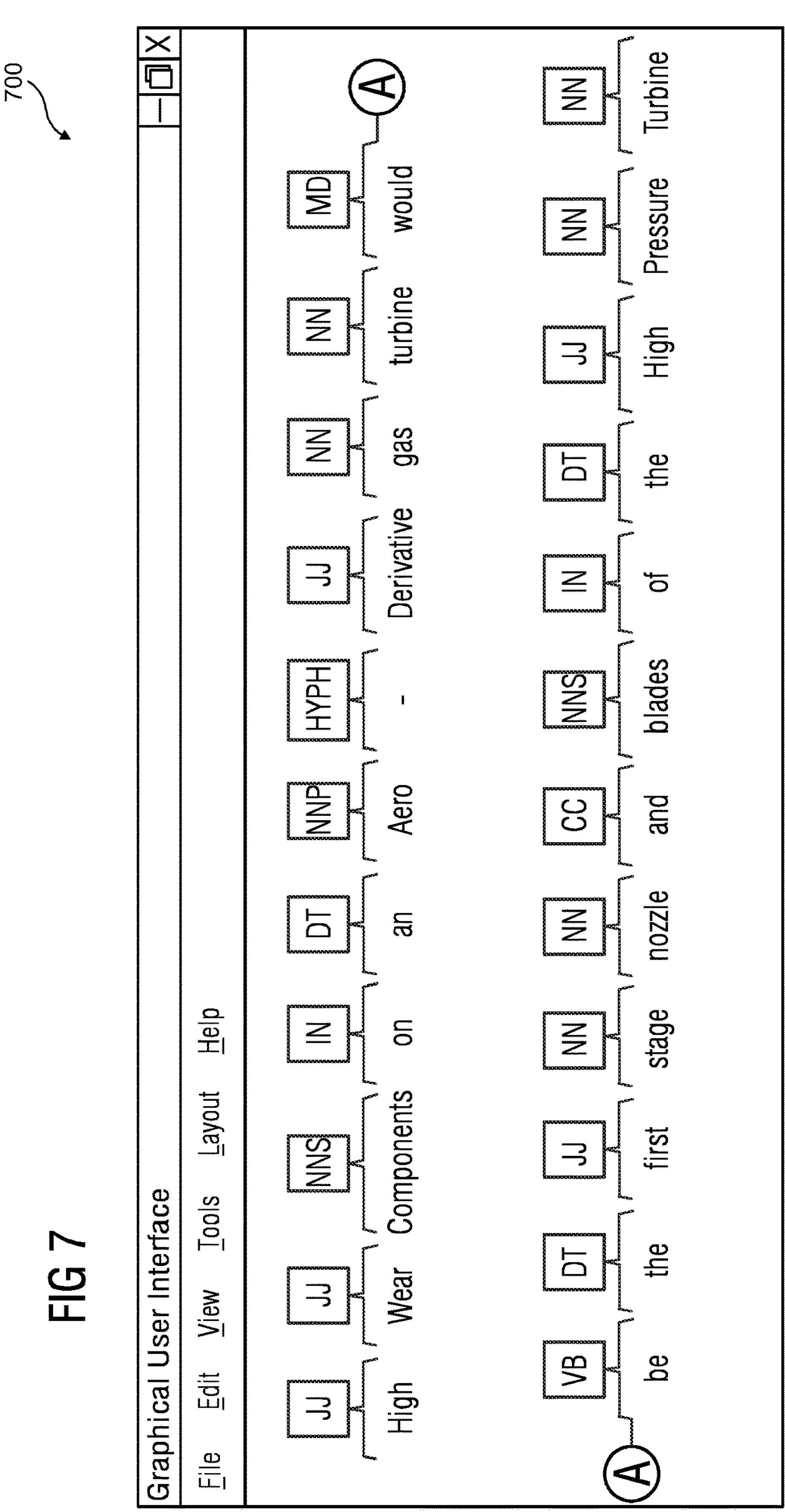
FIG. 7 shows a pre-processed sentence using NER segmentation for knowledge graph updation, according to an embodiment of the present invention.

In addition, there may be several synonyms for these machines and components that are to be standardized in order to comprehend the context of the responses furnished by field experts. Once the sentences have been pre-processed and lemmatized, a custom Named entity recognition (NER) module is employed to identify proper nouns, temporal relation and spatial relation in a sentence. One instance of a pre-processed sentence with NER segmentation 700 is shown in FIG. 7.

Once the sentences have been processed by the NER module, appropriate segments can be mapped to the vocabulary of the ontology classes or individuals of the class. In the above example, the classes include ontological terms like "Aero-derivative gas turbine" which is a type of engine; they also have individuals of the "Damage class" like "Thermal barrier coating degradation" and "Oxidation". Associating terms in the sentence to the terms in the ontology or vocabulary enables a high-quality extraction as the attributes to extract are known. Like in the case of damage, extraction of associated sub-component which is "Stage 1 Nozzle" can be extracted and populated into the graph.

In scenario of terms falling outside of the vocabulary of ontology and graph elements extracted from domain literature, the out of vocabulary terms can be vectorized and compared to the word vectors of the available vocabulary to determine the closest match. In addition to using the ontology, the sentence structure can help associate numerical values, negators and other operators to the extracted terms in the sentence. A parse tree can be used to find such relations along with the available links specified by the ontology to populate the knowledge graph.

In certain embodiments, the parse tree helps to form the link between the adjective "High Wear" and a sub-component of the engine "first stage nozzle". An approach combining a custom NER, a dependency parse tree along with the ontology can be used to create a high recall and precise population of a domain specific ontology into a quality knowledge graph.

FIG. 8 shows a schematic block diagram of a system 800 for managing knowledge for a knowledge graph in a computer network 850, according to an embodiment of the present invention. In one particular embodiment, the system 800 may be provisioned on a cloud computing platform to perform the above-mentioned methods.

In FIG. 8, the system 800 is implemented on one or more computing devices 810, comprising of multiple question generation devices 810(*a*) in communication with each other and with an expert device 810(*b*) over a computer network 850 via one or more wired and/or wireless data communication links, where each communication link comprises one or more of wires, routers, switches, transmitters, receivers, or the like. The knowledge management system 800 and network 850 enables question/response generation functionality for respective computing devices 810. Other embodiments of the system 800 may be used with components, systems, sub-systems, and/or devices other than those that are depicted herein. In one embodiment, generation of contextually relevant questions and receiving of adequate responses thereto are all routed through the network 850. The network 850 includes local network connections and remote connections in various embodiments, such that the system 800 may operate in any of local or global environments.

In certain embodiments, the computing devices 810 including the question generation device 810(*a*) and an expert device 810(*b*), 810(*c*) are the same device, comprising a processing unit 802, a memory 805 connected to the processing unit 802 via a system bus 804. The computing device 810 further comprises mass storage device 806 for storing program modules 807 and a display 812. The program modules 807 may include modules executable to perform one or more functions associated with embodiments shown in one or more of FIGS. 1-7. The display 812 further includes a Graphical User Interface (GUI) 814. In one example embodiment, the GUI 814 is configured to input user query for generating contextually relevant questions and display response to these questions received from the expert device 810(*b*), 810(*c*). Example computing devices include a mobile computing device such as a laptop or a mobile phone, a tablet computer, or other communication device, a personal digital assistant (PDA), or the like.

In an embodiment, using the method and system of the present invention, improved ways of knowledge management for a knowledge graph are realized. Precisely, the knowledge graphs are identified for missing links such that inquisitive and contextually relevant questions may be asked. This is useful in extracting valuable nuggets of knowledge around known unknowns from experts in real time. Further, extraction of adequate information is promised as additionally informative questions are posed to explore tacit knowledge of expert. The responses received from expert are evaluated for their specificity, inquisitiveness and non-repetitive, which solves a long-standing technical problem of asking redundant and routine questions. These responses are automatically populated in the knowledge graph to attain knowledge graph completion besides assisting in quick and informed decision making from such completed graphs. As embodiments of the present invention enable positing appropriate and relevant questions for the expert, much time and effort is saved in otherwise deviating towards a pointless discussion.

Those of ordinary skill in the art will appreciate that the hardware depicted in FIG. 8 may vary depending on the implementation. Other internal hardware or peripheral devices, such as flash memory, equivalent non-volatile memory, or optical disk drives and the like, may be used in addition to the hardware depicted in FIG. 8. Also, the processes of the illustrative embodiments may be applied to a multiprocessor data processing system, without departing from the spirit and scope of embodiments of the present invention.

Embodiments of the present invention can take a form of a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

Although the present invention has been disclosed in the form of preferred embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

The invention claimed is:

1. A computer implemented method of knowledge management for a knowledge graph, the method comprising:

identifying, by a processing unit, one or more missing links in the knowledge graph by: determining individual predicate for semantically similar nodes having a cosine distance smaller than a predetermined threshold, combining the individually determined predicate by a union operation, and comparing the combined predicate with the individually determined predicate to identify the one more missing links between the semantically similar nodes;

generating, by the processing unit, one or more inquisitive and contextually relevant questions around the identified missing links for an expert of a domain;

receiving response to the questions from the expert via a user interface;

generating, by the processing unit, one or more additional informative questions based on the domain or the response received from the expert or a combination thereof;

evaluating, by the processing unit, the additional informative questions based on a ranking metric derived from a combination of parameters; and populating the missing links in the knowledge graphs, displayed on the user interface, with one or more responses generated corresponding to the evaluated additional informative questions having a highest-ranking metric.

2. The method according to claim 1, wherein the knowledge graph comprises plurality of nodes representative of plurality of entities within a domain specific corpus, and edges between the plurality of nodes representative of relationships existing between the entities.

3. The method according to claim 2, wherein the relationships between an entity and an entity of interest from the plurality of entities are based on non-trivial similarity between connectivity patterns of the entity and the entity of interest.

4. The method according to claim 2, further comprising transforming, by the processing unit, the plurality of nodes and the edges into one or more embeddings, each of the embeddings being a vector signifying features of a corresponding entity and an embedded relationship between the entities of the knowledge graph.

5. The method according to claim 4, further comprising determining, by the processing unit, a semantic similarity between the plurality of nodes based on cosine distance between representative vectors.

6. The method according to claim 1, wherein the one or more inquisitive and contextually relevant questions are generated in natural language to harness information gaps where missing information is not yet identified of the domain using natural language processing approach.

7. The method according to claim 1, wherein a factoid-based inquisitive and contextually relevant question understandable to the expert is generated, by the processing unit, from a node selected along with a corresponding predicate having unknown tail node value.

8. The method according to claim 1, wherein the one or more inquisitive and contextually relevant questions are generated upon the identification of missing links, wherein the missing links are identified through predicate comparison of semantically similar nodes, by the processing unit, using a sequence-to-sequence model with an encoder-decoder architecture to:

encode at least a subsection of graph to obtain a topic representation;

encode each pair of the inquisitive and contextually relevant question along with the response received thereto with the encoded topic representation; and apply decoder with attention to the topic representation and encoded question-response pair to generate the one or more additional informative questions.

9. The method according to claim 1, wherein the one or more additional informative questions are generated to address tacit knowledge gaps explored through topic-based textual paragraphs provided by experts, by the processing unit, using a sequence-to-sequence model with an encoder-decoder architecture to:

encode at least a textual paragraph of specific topic within the domain to obtain a topic representation;

encode each pair of the inquisitive and contextually relevant question along with the response received thereto with the encoded topic representation; and apply decoder with attention to the topic representation and encoded question-response pair to generate the one or more additional informative questions.

10. The method according to claim 1, wherein the ranking metric is derived from the combination of parameters comprising inquisitiveness metric, specificity metric and repetitiveness of the additional informative questions generated.

11. The method as claimed in claim 9, wherein the ranking metric is computed by the processing unit as:

$$\text{Ranking metric}=\lambda*\text{inquisitiveness metric}+(1-\lambda)*\text{specificity metric}-\lambda 2*\text{repetitiveness};$$

where $\lambda$ is a first hyperparameter; and $\lambda 2$ is a second hyperparameter.

12. A system of knowledge management for knowledge graph, comprising:

a processing unit, and a memory coupled to the processing unit, wherein the memory comprises instructions which, when executed by the processing unit, configures the processing unit to perform the method steps as claimed in claim 1.

13. A computer program product, comprising a computer readable hardware storage device having computer readable program code stored therein, said program code executable by a processor of a computer system to implement a method according to claim 1.

* * * * *